(12) United States Patent
Breau

(10) Patent No.: US 8,683,019 B1
(45) Date of Patent: Mar. 25, 2014

(54) ENABLING EXTERNAL ACCESS TO A PRIVATE-NETWORK HOST

(75) Inventor: Jeremy Richard Breau, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 319 days.

(21) Appl. No.: 13/013,585

(22) Filed: Jan. 25, 2011

(51) Int. Cl.
*G06F 15/177* (2006.01)

(52) U.S. Cl.
USPC ........................................................ 709/220

(58) Field of Classification Search
USPC ........................................................ 709/220
See application file for complete search history.

(56) References Cited

U.S. PATENT DOCUMENTS

| | | | |
|---|---|---|---|
| 7,320,027 B1 * | 1/2008 | Chang et al. | 709/219 |
| 7,450,585 B2 * | 11/2008 | Dispensa | 370/392 |
| 7,453,852 B2 * | 11/2008 | Buddhikot et al. | 370/331 |
| 7,454,489 B2 * | 11/2008 | Chauffour et al. | 709/223 |
| 7,515,549 B2 * | 4/2009 | Wing et al. | 370/252 |
| 7,630,341 B2 * | 12/2009 | Buddhikot et al. | 370/331 |
| 7,827,313 B2 * | 11/2010 | Salmela et al. | 709/246 |
| 7,873,825 B2 * | 1/2011 | Jokela et al. | 713/153 |
| 8,184,641 B2 * | 5/2012 | Alt et al. | 370/395.54 |
| 8,230,050 B1 * | 7/2012 | Brandwine et al. | 709/220 |
| 8,451,797 B2 * | 5/2013 | Buddhikot et al. | 370/331 |
| 2010/0061309 A1 * | 3/2010 | Buddhikot et al. | 370/328 |
| 2010/0284400 A1 * | 11/2010 | Melen et al. | 370/389 |
| 2010/0306350 A1 * | 12/2010 | Salmela et al. | 709/220 |
| 2011/0182227 A1 * | 7/2011 | Rune | 370/312 |
| 2011/0296027 A1 * | 12/2011 | Salmela et al. | 709/226 |
| 2012/0079031 A1 * | 3/2012 | Matthews et al. | 709/206 |

FOREIGN PATENT DOCUMENTS

WO   WO 2010088957 A1 *   8/2010   ............... H04L 29/12

OTHER PUBLICATIONS

Srisuresh, P., RFC 3022: Traditional IP Network Address Translator (Traditional NAT), Jan. 2001, IETF, pp. 1-16.*
RFC 3022, Traditioinal IP Network Address Translator (Traditional NAT), Jan. 2001, 1-16.
RFC 1631, The IP Network Address Translator (NAT), May 1994, 1-10.

* cited by examiner

*Primary Examiner* — Alicia Baturay

(57) ABSTRACT

Network address translation allows hosts within a private network ("internal hosts") to access the Internet through a single or a limited number of public IP addresses. When an internal host accesses the Internet, NAT translates the internal host's private IP address into a temporary public IP address for a given session. A method and media are provided for enabling a host external to the private network ("external host") to initiate communication with an internal host. The internal host requests that a global address be mapped to its private address. The internal host receives the global address and sends it to a server where it is available to an external host. The mapping between the private address and the global address is maintained in a NAT system so that an inbound connection request from an external host can be forwarded to the internal host.

19 Claims, 4 Drawing Sheets

ENABLING EXTERNAL ACCESS TO A PRIVATE-NETWORK HOST

SUMMARY

A high-level overview of various aspects of the invention is provided here for that reason, to provide an overview of the disclosure, and to introduce a selection of concepts that are further described below in the detailed-description section. This summary is not intended to identify key features or essential features of the claimed subject matter, nor is it intended to be used as an aid in isolation to determine the scope of the claimed subject matter.

In a first aspect, a set of computer-useable instructions provide a method of enabling a host external to a private network ("external host") to initiate communication with a host internal to the private network ("internal host"). The internal host has a private address within the private network. A request is received from the internal host for a public Internet Protocol (IP) address. A public IP address is assigned to the internal host and is mapped to the private IP address of the internal host. The public IP address is communicated to the internal host. The internal host sends the public IP address to a network element that makes the public IP address available to the external host. The external host receives the public IP address and initiates a connection with the internal host via the public IP address.

In a second aspect, an internal host is provided with a public IP address that is accessible to an external host. An application programming interface (API) enables the internal host to request the public IP address. A request for the public IP address is received from the internal host. The public IP address is mapped to the private IP address of the internal host and is communicated to the internal host. The internal host makes the public IP address available to the external host. The public IP address is provided to a Network Address Translation (NAT) system, which forwards a communication received at the public IP address to the private IP address of the internal host.

In a third aspect, a set of computer-useable instructions provide a method of providing a global address (that is available to an external host) for an internal host that has a private address (the private address is not accessible to the external host). The internal host sends a request for the global address to be mapped to the private address. The internal host receives the global address that is mapped to the private address. The internal host sends the global address to a server. The global address is available to the external host by way of the server.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
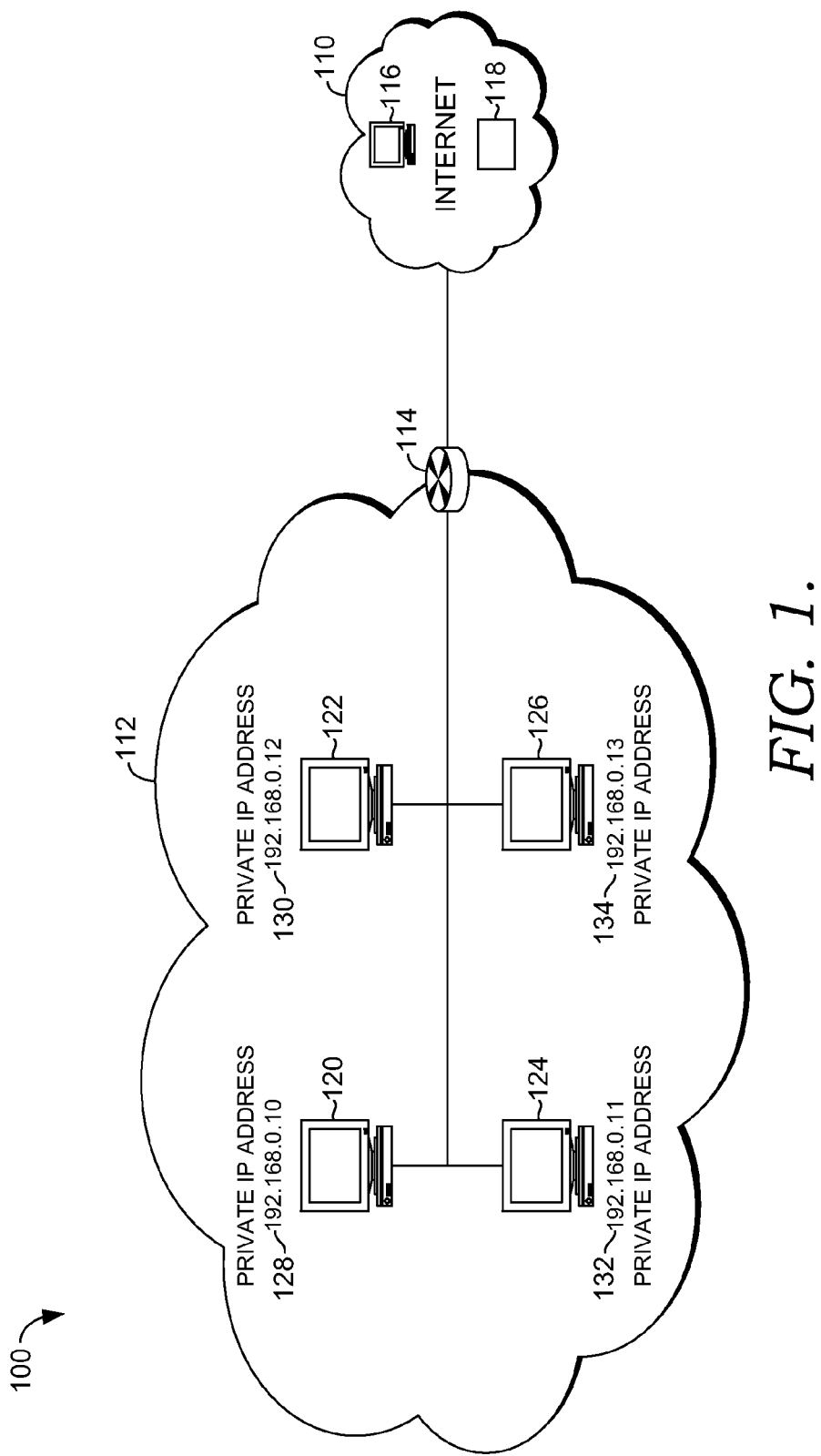
FIG. 1 depicts an illustrative operating environment for use in accordance with an embodiment of the present invention.

The subject matter of some embodiments of the present invention is described with specificity herein to meet statutory requirements. But the description itself is not intended to necessarily limit the scope of the claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

API Application Programming Interface
CDMA Code Division Multiple Access
DNS Domain Name Server
GPRS General Packet Radio Service
GSM Global System for Mobile Communications
IP Internet Protocol
LAN Local Area Network
NAT Network Address Translation
PDA Personal Data Assistant
TDMA Time Division Multiple Access Further, various technical terms are used throughout this description. An illustrative resource that fleshes out various aspects of these terms can be found in Newton's Telecom Dictionary, 25th Edition (2009).

Embodiments of the present invention can take the form of a method, system, or computer-readable media embodied with a specific set of computer-executable instructions. Computer-readable media includes both volatile and nonvolatile media, removable and nonremovable media, and contemplates media readable by a database, a switch, and various other network and computing devices. Computer-readable media includes media implemented in any method or technology that stores information. Examples of stored information include computer-useable instructions, data structures, program modules, and other data representations. Examples of computer-readable media include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. The computer-readable media can store data momentarily, temporarily, or permanently.

Most broadband connections use IPv4 to connect to the Internet. There is an inherent limitation in IPv4 in that addressing is limited to approximately four billion addresses and most of those are in use. Network Address Translation (NAT) provides a way to reduce the number of Internet Protocol (IP) addresses needed to provide Internet connectivity to all of the computers or devices that require it, especially where such computers are part of a private network.

NAT allows hosts within a private network ("internal hosts"), each having its own private IP address within that network, to access the Internet through a single public IP address or a limited number of public IP addresses. When an internal host accesses the Internet, NAT translates the internal host's private IP address into a temporary public IP address for a given session.

NAT is performed by a device that is connected to the Internet and hides the internal hosts from hosts that are external to the private network ("external hosts"), thus making the entire private network appear as one device or computer (or a small number of devices, in the case where NAT maintains a pool of public IP addresses) to the rest of the world. All communications between internal hosts and external hosts are handled by the NAT device, which provides the appropriate address translations.

All requests generated by the internal hosts that are within the private network are sent to the Internet via the NAT device. A packet received by the NAT device from an internal host is associated with both a source address and a source port. As each packet from an internal host is received by the NAT device, the NAT device performs address and port translation on the packet. The NAT device strips the private source address and port from the network layer (e.g., 192.168.0.10:101, where 192.168.0.10 is the address and 101 is the port), and replaces them with a public IP address and port (e.g., 203.31.220.134:301) before sending the packet to the Internet. Thus, the packet then seems to have originated from the public IP address and port.

The public IP address may be the public IP address of the NAT device itself. In an embodiment, a packet received by the NAT device from a different internal host may be assigned the same public IP address, but a different port. Thus, the port assignment made by the NAT device distinguishes between packets that originate from different internal hosts.

In the event that the NAT device maintains a pool of public IP addresses, NAT is performed in the same manner. In that case, packets from different internal hosts are not necessarily translated to the same public IP address.

NAT is used in many kinds of networks, for example, local-area networks typically use NAT. A number of wireless service providers use private address spaces for hosts within their networks and employ NAT.

An internal host may initiate a connection with another internal host (within the same private network) by sending communications to the other internal host's private IP address. The other internal host responds by sending communications to the first internal host's private IP address.

However, when an internal host wants to initiate a connection with an external host, it has historically done so by way of the NAT device, as described above. An outgoing connection request from the internal host to an external host passes through the NAT device, which performs address and port translation as described above, temporarily mapping a public IP address to the private IP address of the internal host. The NAT device then sends the connection request to the destination external host. When the external host receives the connection request, it responds to what it believes is the origination address of the request, but in reality it responds to the public IP address and port provided by the NAT device. The external host's response is received by the NAT device, which translates the destination address of the response to the private IP address associated with the internal host, based on the destination port of the packet.

The NAT device maintains a translation table containing the mapping between the internal host's private address and the public address. The mapping, however, is temporary and persists only for a given session. At a later time, should the external host try to initiate a connection with the internal host by using the public IP address, it will fail because that particular mapping will no longer exist.

An exception to the temporary nature of the mapping occurs with static NAT. In static NAT, the mapping between an internal host's private IP address and public IP address is permanent. Because static NAT requires exclusive use of that IP address by the internal host, the advantage of sharing a single IP address among multiple hosts is lost. Static NAT may be used, for example, when an internal host is a web server, and it is desirable for external hosts to initiate connections with the internal host at any time.

FIG. 1 depicts an illustrative operating environment for use in accordance with an embodiment of the present invention and is generally referred to as environment 100. Environment 100 is but one example of a suitable environment.

Environment 100 includes the Internet 110 and a private network 112. Private network 112 may be a LAN, a service provider's network, such as a wireless service provider network, or any type of network that utilizes private IP addresses for its internal hosts.

Private network 112 interfaces with Internet 110 via a NAT device 114. NAT device 114 is not limited to one particular type of device. For example, it could be a router, a server, or other network element or network-enabled device, as long as the device is able to perform NAT functions.

Within Internet 110 is a host 116. Host 116 may be a personal computer, a PDA, a mobile phone, a game device, a server, or other device that is capable of communicating over an IP network such as Internet 110. Although not illustrated in FIG. 1, in an embodiment, host 116 resides in another private network instead of Internet 110. From the perspective of NAT device 114 it makes no difference whether external host 116 is connected to Internet 110 or another private network. The NAT function performed by NAT device 114 is the same either way. If external host 116 is connected to another private network, it would be internal to that network but would still be external to private network 112.

Also within Internet 110 is a network element 118. Network element 118 may be a server, a host, or other type of device that is accessible by external host 116 and other hosts that are external to private network 112. In an embodiment, network element 118 is a domain name system (DNS) server.

Within private network 112 are internal hosts 120, 122, 124, and 126. Internal hosts 120, 122, 124, and 126 have private IP addresses 128, 130, 132, and 134, respectively, as depicted in FIG. 1. Internal hosts 120, 122, 124, and 126 may be personal computers, PDAs, mobile phones, game devices, and other devices that are capable of communicating over an IP network such as private network 112.

Figure 2:
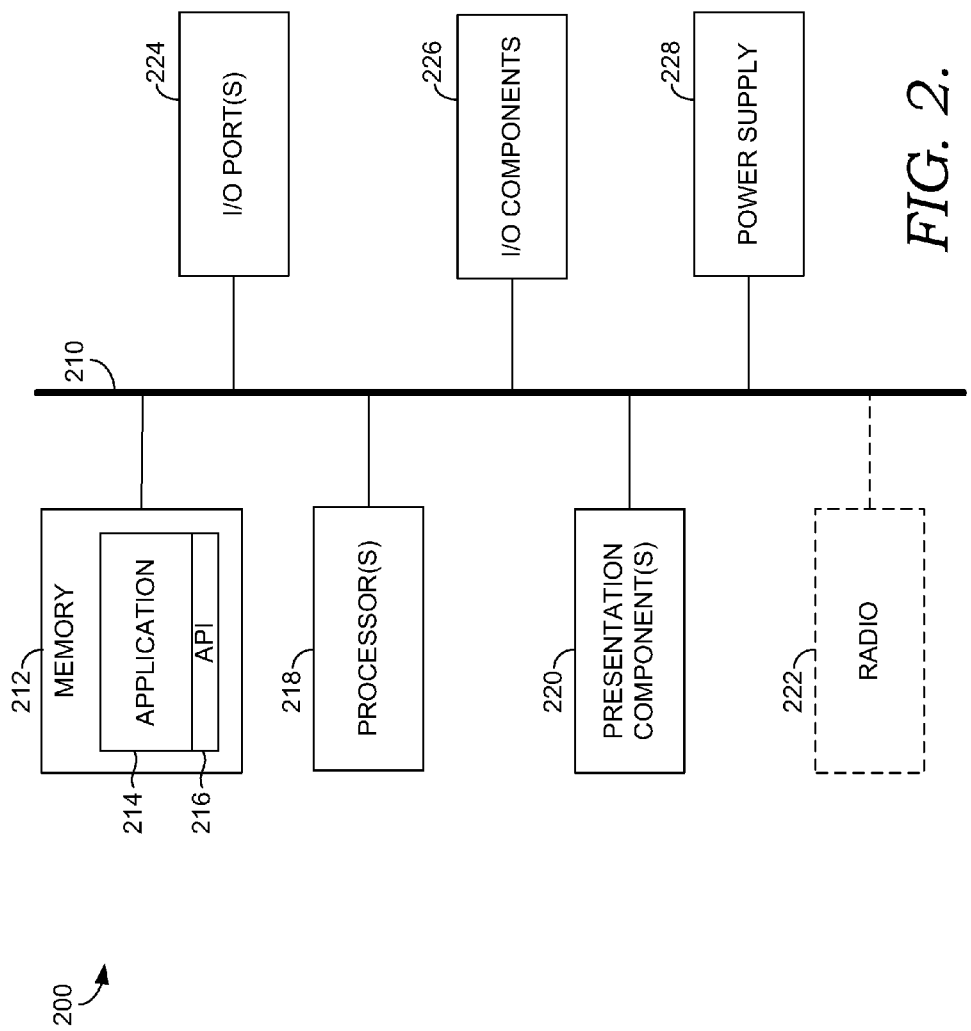
FIG. 2 is a block diagram depicting an illustrative internal host in accordance with an embodiment of the present invention.

Turning now to FIG. 2, a block diagram depicts an illustrative internal host in accordance with an embodiment of the present invention, and is referred to generally as internal host 200. Internal host 200 is but one example of a suitable internal host. Although some components are shown in the singular, they may be plural. For example, internal host 200 might include multiple processors or I/O ports, etc. As illustratively shown, internal host 200 includes a bus 210 that directly or indirectly couples various components together including memory 212, a processor 218, a presentation component 220, radio 222, input/output ports 224, input/output components 226, and a power supply 228.

Memory 212 might take the form of one or more of the aforementioned media. Thus, we will not elaborate more here, only to say that memory component 212 can include any type of medium that is capable of storing information in a manner readable by a computing device.

An application 214 is stored in memory 212 in one embodiment, and may actually be multiple applications. Application 214 enables internal host 200 to perform a number of functions. Illustrative functions include enabling internal host 200 to access a service over a network, receive user input via I/O components 226, and provide information to a user via a presentation component 220. Examples of application 214 include a game and a web server. Application 214 utilizes an application programming interface (API) 216 to interact with an address-mapping function in one embodiment.

Processor 218 might actually be multiple processors that receive instructions and process them accordingly. Presentation component 220 may include the likes of a display, a speaker, as well as other components that can present information (such as a lamp (LED), or even lighted keyboards).

One embodiment of internal host 200 includes a radio 222. Radio 222 represents a radio that facilitates communication with a wireless telecommunications network. Illustrative wireless telecommunications technologies include CDMA, GPRS, TDMA, GSM, and the like. In some embodiments, radio 222 facilitates other types of wireless communications including Wi-Fi communications and GIS communications. Examples of internal host 200 that include radio 222 are mobile phones, wireless-enabled laptop computers, PDAs, and other devices that utilize wireless network access.

Input/output port 224 might take on a variety of forms. Illustrative input/output ports include a USB jack, stereo jack, infrared port, proprietary communications ports, and the like. Input/output components 226 include items such as keyboards, microphones, touch screens, and any other item usable to directly or indirectly input data into internal host 200. Power supply 228 includes items such as batteries, fuel cells, or any other component that can act as a power source to power internal host 200.

Figure 3:
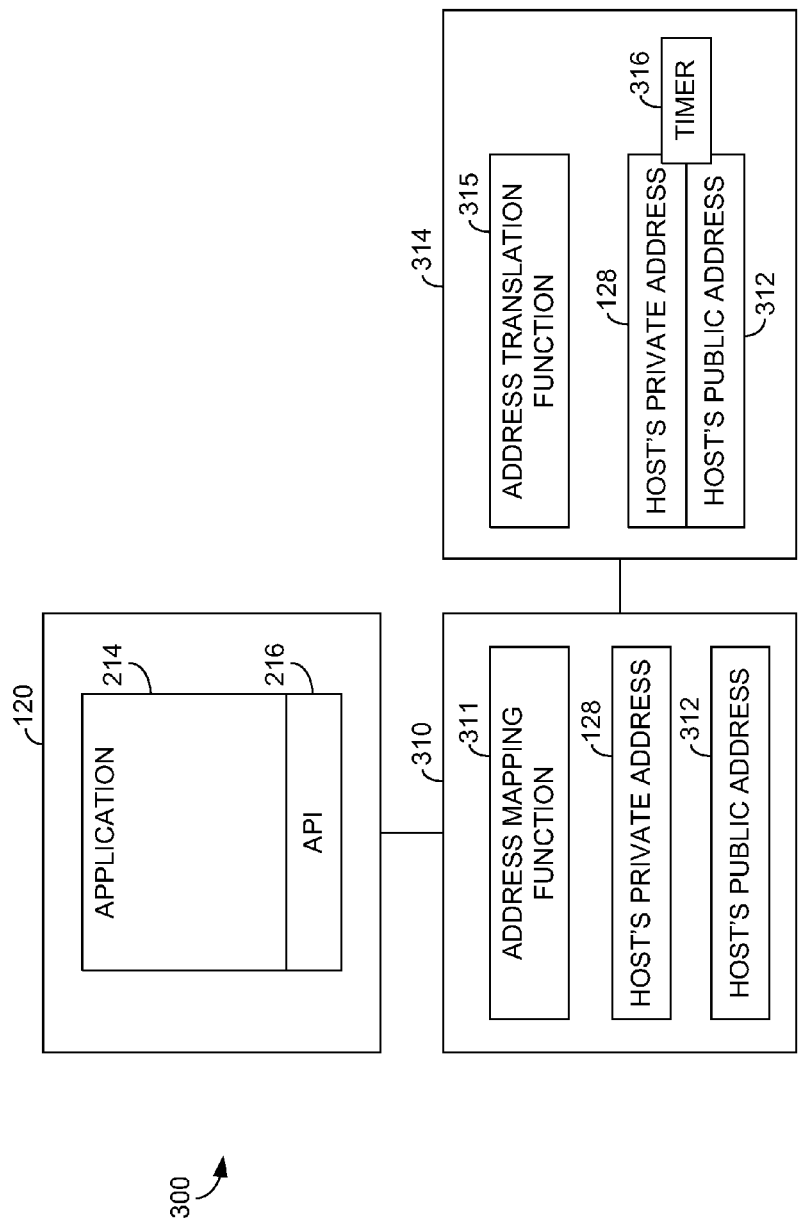
FIG. 3 is a block diagram depicting an illustrative operating environment for use in accordance with an embodiment of the present invention.

Referring now to FIG. 3, a block diagram depicts an illustrative operating environment for use in accordance with an embodiment of the present invention and is generally referred to as operating environment 300. Operating environment 300 is but one example of a suitable operating environment.

Operating environment 300 includes a network element 310, a network element 314, and an internal host 120 of FIG. 1. Network element 310 performs an address-mapping function 311 by mapping a public IP address 312 to an internal host 120's private IP address 128 (in response to a request from internal host 120 for a public IP address) (as described below, private IP address 128 corresponds to private IP address 128 depicted in FIG. 1).

Internal host 120 includes application 214 and API 216. In an embodiment, application developers are provided with API 216, which facilitates communication with address-mapping function 311. In an embodiment, API 216 provides function calls for requesting a public IP address from mapping function 311, receiving the public IP address, and publishing the public IP address. For example, a user may download a game onto a host at a private IP address, and then host the game. The user may want another user, at an external host, to connect to the game. The game developer uses function calls from API 216, enabling the game application to request a public IP address and publish it, for example, by registering the public IP address with a DNS server such that the public IP address becomes available to the external host.

Network element 314 performs an address-translation function 315 and maintains the mapping between the public and private IP addresses for a given duration, based on a timer 316. In one embodiment, address-translation function 315 is a Network Address Translation (NAT) function, which is a process of modifying network address information in IP packet headers as they pass through a network element to remap one IP address space into another. In an embodiment, address-translation function 315 is implemented in a Linux environment using iptables, which is a Linux tool for controlling packet traffic.

In some embodiments address-mapping function 311 and address-translation function 315 are performed by a combination of network elements. In other embodiments address-mapping function 311 and address-translation function 315 are performed by the same network element. Illustrative devices that may embody any or all of those functionalities include servers, gateways, and routers.

Figure 4:
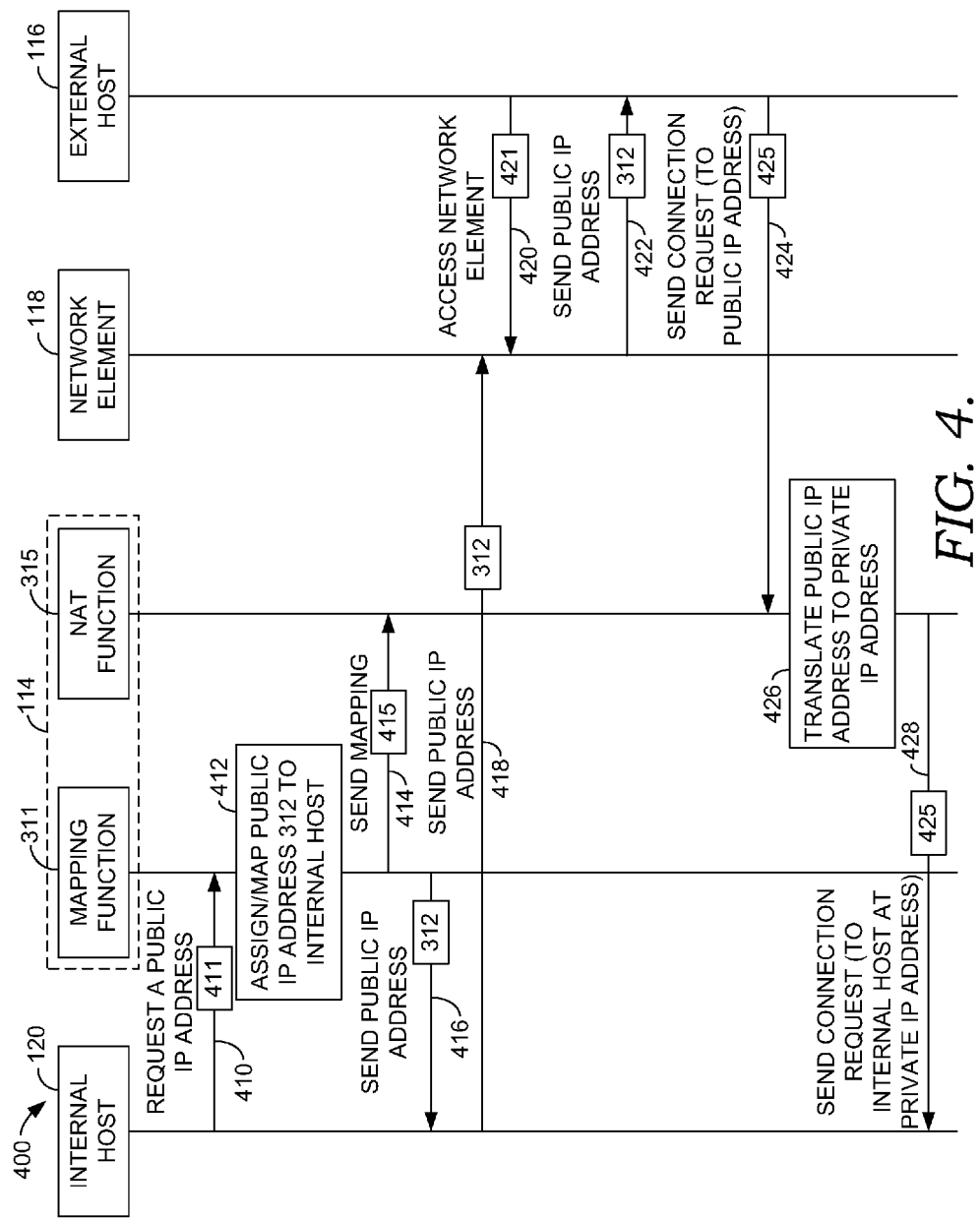
FIG. 4 is a flow diagram depicting an illustrative method for use in accordance with an embodiment of the present invention.

Referring now to FIG. 4, a flow diagram depicts an illustrative method in accordance with an embodiment of the present invention and is generally referred to as method 400. Method 400 is but one example of a suitable method.

FIG. 4 is described in conjunction with FIGS. 1, 2, and 3. In an embodiment, address-mapping function 311 and address-translation function 315 both reside in router 114.

At a step 410, internal host 120 sends a request 411 for a public IP address to router 114. In an embodiment, request 411 for the public IP address is generated by application 214 residing on host 120. With the advent of application stores and proliferation of application development, it is desirable to provide hosts, and application developers, a way to receive inbound connections at an internal host from Internet hosts (or other external hosts). In an embodiment, application 214 uses one or more API 216 function calls to request and receive the public IP address.

At a step 412, address-mapping function 311 assigns, or maps, public IP address 312 to the private address 128 of internal host 120. Although in one embodiment the functionality of address-mapping function 311 resides within router 114, in other embodiments, as described above, address-mapping function 311 resides in a separate device or devices, for example, a server or other network element. In some embodiments, router 114 is a server or other network element.

At a step 414, address-mapping function 311 communicates the resultant mapping 415 to address-translation function 315 in router 114. Address-translation function 315 maintains mapping 415 in an address-translation table for a duration of time that is monitored by a timer 316 associated with mapping 415. The duration is not necessarily tied to the duration of a particular session. The duration may be anywhere from a few seconds (or even less) to an indefinite amount of time, depending on the particular application or need. In one embodiment, the user pays for a subscription that permits an ongoing mapping, which would be appropriate for hosting a web server. If the application is a game, then an hour might be adequate. In some embodiments, either address-mapping function 311 or address-translation function 315 decides the duration of mapping 415. Generally, mapping 415 persists for the duration of time such that one or more external hosts may initiate a connection with the internal host by way of public IP address 312. In an embodiment, address-mapping function 311 communicates the duration of mapping 415 to internal host 120. Thus, when mapping 415 times out, internal host 120 may opt to request another public IP address, which may or may not be the same as public IP address 312.

At a step 416, address-mapping function 311 sends public IP address 312 to internal host 120. At a step 418, internal host 120 publishes public IP address 312 by communicating public IP address 312 to network element 118. In an embodiment, internal host 120 uses one or more API 216 function calls to publish public IP address 312. Network element 118 stores public IP address 312 such that it is available to external host 116.

In one embodiment, network element 118 is a DNS server and step 418 includes internal host 120 registering public IP address 312 with the DNS server. In another embodiment, network element 118 is a rendezvous server connected to the Internet. A rendezvous server provides a stable IP address for internal host 120, and associates that stable IP address with an IP address of host 120, which in this case would be public IP address 312. So, the rendezvous server would forward packets received at the stable IP address to public IP address 312. In the event that the mapping between private IP address 128 and public address 312 times out, as described above, host 120 can request another public IP address and then update network element 118 with the new public IP address.

When external host 116 desires to initiate a connection with internal host 120, external host 116 accesses network element 118 at a step 420 to retrieve public IP address 312. In one embodiment, if network element 118 is a DNS server 118, then external host 116 sends a request 421 for the IP address associated with internal host 120's domain name. Network element 118 (whether a DNS server or other device) need not be directly accessed by external host 116. In an embodiment, external host 116 accesses a different DNS server, which in turn communicates with DNS server 118 to obtain the IP address associated with the domain name. In that case, DNS server 118 is indirectly accessed by external host 116.

At a step 422, external host 116 receives public IP address 312 from network element 118 (either directly or indirectly). External host 116 is thus enabled to establish a connection with internal host 120 at a step 424 by sending a connection request 425 to public IP address 312, which is received by router 114. At a step 426, address-translation function 315 translates public IP address 312 to private IP address 128, and at a step 428 router 114 sends connection request 425 to internal host 120 at private address 128. Thus, external host 116 is enabled to initiate a connection with internal host 120 by way of public IP address 312 that is published by internal host 120.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more nontransitory computer-readable media having computer-executable instructions embodied thereon that, when executed, perform a method of enabling a host external to a private network ("external host") to initiate communication with a host internal to the private network ("internal host"), wherein the internal host is associated with a private IP address, the method comprising:
from the internal host, receiving a request to receive a public Internet Protocol (IP) address;
assigning the public IP address to the internal host, wherein the public IP address is mapped to the private IP address of the internal host; and
communicating the public IP address to the internal host, wherein the public address is a public address of a network address translation (NAT) device that performs address translation between hosts internal to the private network and hosts external to the private network,
A) wherein the internal host is enabled to communicate the public IP address to a network element that makes the public IP address available to the external host, and
B) wherein the external host is enabled to receive the public IP address and initiate a connection with the internal host via the public IP address.

2. The media of claim 1, wherein the public IP address is mapped to the private IP address of the internal host by a network element that connects the private network to an external network.

3. The media of claim 1, wherein a network element that connects the private network to an external network performs network address translation (NAT) between the internal host and the external host by translating network address information in IP packet headers between the private IP address of the internal host and the public IP address.

4. The media of claim 1, wherein making the public IP address available to the external host includes communicating the public IP address to a server, wherein the server provides the external host with access to the public IP address.

5. The media of claim 4, wherein the server is a domain name system (DNS) server.

6. The media of claim 4, wherein the server is a rendezvous server that provides the external host with access to the public IP address by associating a stable IP address with the public IP address, wherein the stable IP address is known by the external host, and wherein packets from the external host received at the stable IP address are forwarded to the public IP address.

7. A method for providing a host in a private network ("internal host") with a public Internet Protocol (IP) address that is accessible to a host that is not in the private network ("external host"), the method comprising:
providing an application programming interface (API) that enables the internal host to request the public IP address;
receiving, from the internal host, a request for the public IP address;
mapping the public IP address to the private IP address of the internal host;
communicating the public IP address to the internal host, wherein the public IP address is a public IP address of a network address translation (NAT) system that performs address translation between internal hosts and external hosts, wherein the internal host is enabled to make the public IP address available to the external host; and
providing the mapping to the NAT system, wherein the NAT system is enabled to forward a communication received at the public IP address of the NAT system to the private IP address of the internal host.

8. The method of claim 7, wherein an application on the internal host utilizes the API to request the public IP address.

9. The method of claim 7, wherein making the public IP address available to the external host includes the internal host communicating the public IP address to a server, wherein the public IP address is available to the external host.

10. The method of claim 9, wherein the server is a domain name system (DNS) server.

11. The method of claim 9, wherein the mapping between the private IP address and the public IP address is temporary, wherein the mapping is maintained for a period of time.

12. The method of claim 7, wherein the internal host is not directly accessible by the external host by way of the private IP address.

13. One or more nontransitory computer-readable media having computer-executable instructions embodied thereon that, when executed, perform a method of providing a global address for a host in a private network ("internal host"), wherein the internal host has a private address, and wherein the global address is available to a host that is not in the private network ("external host") the method comprising:

sending, from the internal host, a request for the global address to be mapped to the private address, wherein the private address is not accessible to the external host;

receiving, at the internal host, the global address that is mapped to the private address of the internal host, wherein the global address is a public address of an address-translation device that maintains the mapping of the global address to the private address; and sending the global address from the internal host to a server, wherein the global address is available to the external host by way of the server.

14. The media of claim 13, wherein the request for the global address is sent from the internal host to an address-mapping device.

15. The media of claim 14, wherein the global address is received, at the internal host, from the address-mapping device.

16. The media of claim 15, wherein the address-mapping device and the address-translation device are one and the same.

17. The media of claim 14, wherein the global address enables the external host to initiate communication with the internal host when the external host retrieves the global address and sends an initiation request to the global address.

18. The media of claim 17, wherein when the initiation request is received at the global address it is forwarded to the private address of the internal host.

19. The media of claim 18, wherein the initiation request is received at the global address by the address-translation device.

* * * * *